(12) United States Patent
Scott et al.

(10) Patent No.: US 11,170,000 B2
(45) Date of Patent: Nov. 9, 2021

(54) PARALLEL MAP AND REDUCE ON HASH CHAINS

(71) Applicant: INTUIT INC., Mountain View, CA (US)

(72) Inventors: Glenn Scott, Mountain View, CA (US); Michael R. Gabriel, Mountain View, CA (US)

(73) Assignee: INTUIT INC., Mountain View, GA (US)

(*) Notice: Subject to any disclaimer, the term of this patent is extended or adjusted under 35 U.S.C. 154(b) by 569 days.

(21) Appl. No.: 15/789,700

(22) Filed: Oct. 20, 2017

(65) Prior Publication Data

US 2019/0121894 A1   Apr. 25, 2019

(51) Int. Cl.
| | |
|---|---|
| *G06F 16/23* | (2019.01) |
| *G06F 16/2455* | (2019.01) |
| *H04L 9/06* | (2006.01) |
| *G06F 16/901* | (2019.01) |
| *H04L 9/32* | (2006.01) |

(52) U.S. Cl.
CPC .... *G06F 16/24561* (2019.01); *G06F 16/2379* (2019.01); *G06F 16/9027* (2019.01); *H04L 9/0618* (2013.01); *H04L 9/3236* (2013.01); *H04L 2209/38* (2013.01)

(58) Field of Classification Search
CPC .................................................. H04L 2209/38
USPC ......................................................... 707/756
See application file for complete search history.

(56) References Cited

U.S. PATENT DOCUMENTS

| | | | | |
|---|---|---|---|---|
| 7,650,331 | B1* | 1/2010 | Dean ..................... | G06F 9/5066 712/203 |
| 8,239,846 | B2* | 8/2012 | Luszczek ................ | G06F 8/314 717/149 |
| 9,002,802 | B2* | 4/2015 | Deshmukh .............. | G06F 16/27 707/672 |
| 9,319,066 | B2* | 4/2016 | Master ................. | H03M 7/4093 |
| 9,647,686 | B2* | 5/2017 | Master ................. | G06F 3/0643 |
| 9,871,775 | B2* | 1/2018 | Biggs ..................... | H04L 51/04 |
| 9,990,367 | B2* | 6/2018 | Bowman ............... | G06F 9/5072 |
| 10,225,078 | B2* | 3/2019 | Bibera ................... | G06Q 40/04 |
| 10,291,627 | B2* | 5/2019 | Gleichauf ............. | H04L 63/123 |

(Continued)

OTHER PUBLICATIONS

Siddheshwar, Binary Tree Level Order Traversal, geekRai, Jan. 14, 2016, Retrieved from the Internet: <URL: http://geekrai.blogspot.com/2016/01/ binary-tree-level-order-traversal.html>. See pp. 1-3.

(Continued)

*Primary Examiner* — Hanh B Thai
(74) *Attorney, Agent, or Firm* — Patterson + Sheridan LLP

(57) ABSTRACT

Techniques are disclosed for managing a series of blocks in a distributed system. One embodiment presented herein includes a computer-implemented method, which includes dividing the series of blocks into a plurality of groups. The method further includes distributing the plurality of groups to a plurality of processors. The plurality of processors may apply one or more functions to each group of the plurality of groups in parallel. The method further includes receiving, from the plurality of processors, results of the one or more functions. The method further includes merging the results to generate combined results. The combined results may be used in processing data.

24 Claims, 5 Drawing Sheets

(56) References Cited

U.S. PATENT DOCUMENTS

| | | | |
|---|---|---|---|
| 2001/0034839 A1 | 10/2001 | Karjoth et al. | |
| 2006/0136725 A1* | 6/2006 | Walmsley | H04L 9/3247 |
| | | | 713/171 |
| 2007/0288526 A1* | 12/2007 | Mankad | G06F 11/1662 |
| 2007/0294319 A1* | 12/2007 | Mankad | G06F 11/1662 |
| 2011/0137864 A1* | 6/2011 | Deshmukh | G06F 16/27 |
| | | | 707/648 |
| 2012/0278288 A1* | 11/2012 | Deshmukh | G06F 16/27 |
| | | | 707/672 |
| 2013/0346725 A1 | 12/2013 | Lomet et al. | |
| 2014/0379632 A1 | 12/2014 | Gera et al. | |
| 2015/0381203 A1* | 12/2015 | Master | H03M 7/40 |
| | | | 341/67 |
| 2016/0226518 A1* | 8/2016 | Master | G06F 16/24561 |
| 2017/0031599 A1* | 2/2017 | Bowman | G06F 3/0607 |
| 2017/0048217 A1* | 2/2017 | Biggs | H04L 63/123 |
| 2017/0116221 A1* | 4/2017 | Srivas | H04L 65/102 |
| 2017/0243025 A1* | 8/2017 | Kurian | G06F 21/6245 |
| 2017/0243176 A1 | 8/2017 | Hanke et al. | |
| 2018/0011865 A1* | 1/2018 | Bowman | G06F 16/137 |
| 2018/0109541 A1* | 4/2018 | Gleichauf | H04L 63/123 |
| 2018/0158034 A1* | 6/2018 | Hunt | G06Q 20/00 |
| 2018/0227118 A1* | 8/2018 | Bibera | G06Q 40/04 |

OTHER PUBLICATIONS

International Search Report/Written Opinion issued to PCT/US2018/045354 dated Jan. 3, 2019.

* cited by examiner

PARALLEL MAP AND REDUCE ON HASH CHAINS

FIELD

The present disclosure relates generally to techniques for mapping and reducing in distributed systems, and more particularly to using secondary data structures to improve the efficiency of map and reduce functions in distributed systems.

BACKGROUND

Distributed systems may comprise hash chains (e.g., blockchains), which are data structures that record data in a fashion analogous to a chain. Each update to the chain creates a new block containing the data and each block is linked to the previous block by a cryptographic function. Blocks are only appended to the end of the chain and, once in the chain, cannot be modified without damaging the cryptographic links in the chain. Entities (e.g., applications) which receive data from blocks of the chain may check the cryptographic links to test the validity of the chain. Any modification of a block is detected and subject to remedial or other action. Hash chains are generally managed by peer-to-peer networks which collectively adhere to an established protocol for validating each new block and are designed to be inherently resistant to modification of data. Once recorded, the data in any given block cannot be modified without the alteration of subsequent blocks and the involvement of the network.

A chain generally has no upper limit in its storage requirements. This means that, as blocks are appended, the chain grows without bound. As a result, a chain consumes an increasing amount of storage resources as it is updated. Furthermore, while chains may exist forever, applications and application execution do not, and, as a consequence, applications and other entities that store data on the chain may be required to scan the entire chain one or more times (e.g., when they start and at other times as required) to establish with certainty the complete content or context of data relevant to the application or to locate a particular piece of data. Other operations, such as map or reduce functions, also require iterating through the chain, starting at the last created block (e.g., the tail), moving backward through the chain until each block is processed. The time complexity of these operations is therefore O(n), if performed by a single processing entity. As chains increase in length, these operations require a corresponding increase in resources, including time and processing power.

SUMMARY

One embodiment presented herein includes a computer implemented method for managing a series of blocks in a distributed system. The method generally includes dividing the series of blocks into a plurality of groups. The method further includes distributing the plurality of groups to a plurality of processors, wherein the plurality of processors apply one or more functions to each group of the plurality of groups in parallel. The method further includes receiving, from the plurality of processors, results of the one or more functions. The method further includes merging the results to generate combined results, wherein the combined results are used in processing data.

Additional embodiments include a computing device having a processor and a memory storing one or more application programs configured to perform a method for managing a series of blocks in a distributed system. The method generally includes dividing the series of blocks into a plurality of groups. The method further includes distributing the plurality of groups to a plurality of processors, wherein the plurality of processors apply one or more functions to each group of the plurality of groups in parallel. The method further includes receiving, from the plurality of processors, results of the one or more functions. The method further includes merging the results to generate combined results, wherein the combined results are used in processing data.

Additional embodiments include a non-transitory computer-readable storage medium storing instructions, which when executed on a processor perform a method for managing a series of blocks in a distributed system. The method generally includes dividing the series of blocks into a plurality of groups. The method further includes distributing the plurality of groups to a plurality of processors, wherein the plurality of processors apply one or more functions to each group of the plurality of groups in parallel. The method further includes receiving, from the plurality of processors, results of the one or more functions. The method further includes merging the results to generate combined results, wherein the combined results are used in processing data.

DETAILED DESCRIPTION

Figure 1:
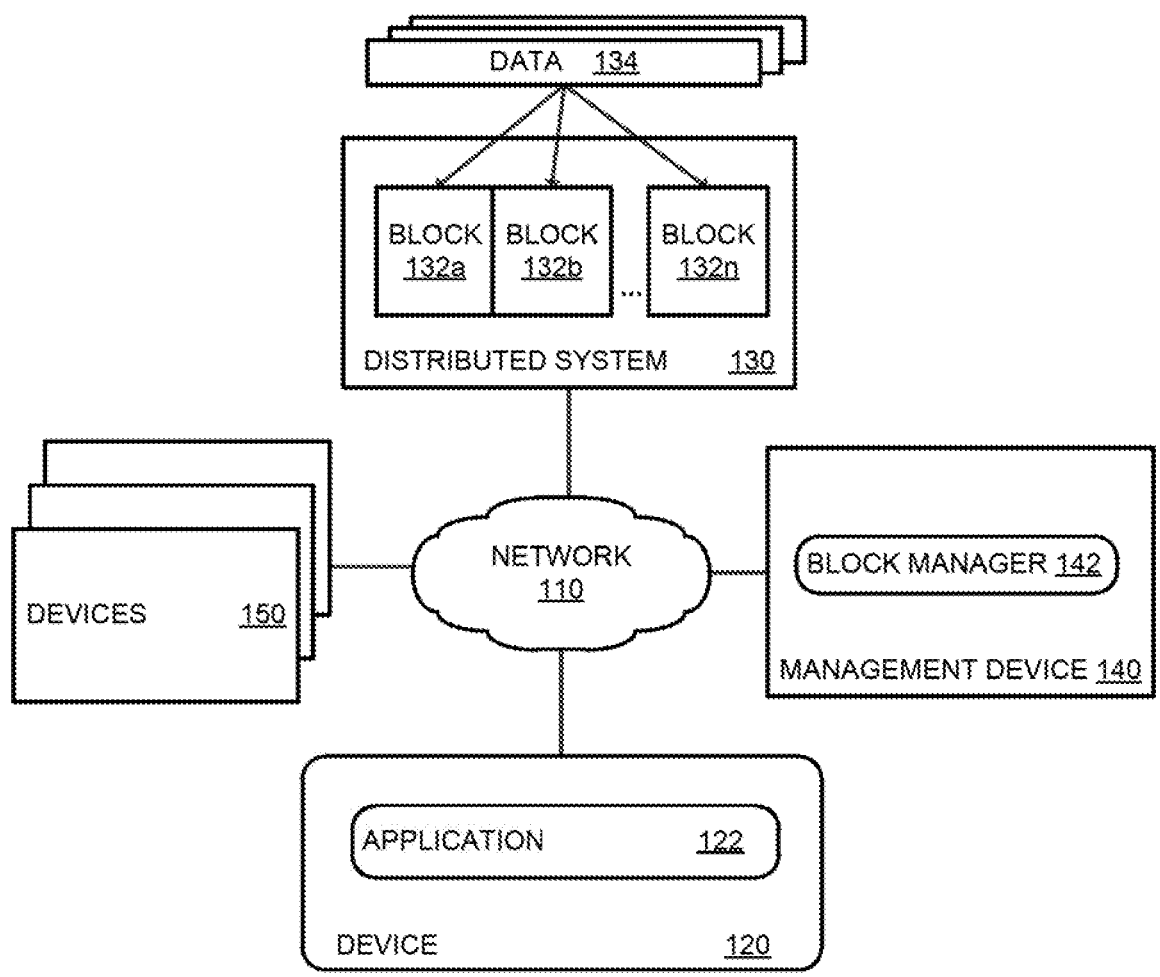
FIG. 1 illustrates an example of a computing environment used for managing blocks in a distributed system, according to one embodiment.

Embodiments presented herein provide techniques for managing blocks in a distributed system. More specifically, embodiments presented herein involve the use of secondary data structures to improve the efficiency of map and reduce functions in distributed systems.

For example, data may be maintained in a distributed system, such as a hash chain, which comprises a plurality of blocks (e.g., a blockchain). In some embodiments, the distributed system may maintain data associated with applications, and every time an application writes a data update to the distributed system, it is appended as a new block. Each block may be resistant to modification and may contain cryptographic information which links to the preceding block and/or the subsequent block. Over time, it may become inefficient to manage, access, and perform functions on the data stored on the chain, as this may require scanning through a very long chain to identify relevant data and performing operations on the data serially. As such, embodiments of the present disclosure involve the use of secondary data structures to improve the efficiency of functions (e.g., map and reduce) in distributed systems.

According to embodiments of the present disclosure, a device associated with management of a distributed system (e.g., a server which performs management functions for a blockchain) may build a secondary data structure (e.g., a list of lists, an array, a split list, a balanced binary tree, a B-tree, or the like) over a series of blocks on a distributed system (e.g., a blockchain) in order to more efficiently perform functions (e.g., map, reduce, and the like) on data stored in the blocks (e.g., application data). For example, the device may divide the series of blocks into a plurality of groups using techniques described herein. The plurality of groups may then be distributed among a plurality of processing entities (e.g., distributed servers or other processing devices) so that the groups may be processed in parallel. This may, for example, comprise applying a function such as map (including filter) or reduce to the individual groups in parallel by the plurality of processing entities. The plurality of processing entities may then provide the results of processing the individual groups back to the device, which may then merge the results into combined results. The combined results may, therefore, comprise the result of applying the function to the entire series of blocks.

Techniques described herein provide for greater efficiency in processing data, particularly in the context of data stored on hash chains. Allowing data stored in a distributed system such as a hash chain to be broken into groups which can be processed in parallel by one or more processing entities improves the functioning of the distributed system by reducing the amount of resources and time required for performing operations on the data.

One of ordinary skill in the art will recognize that the techniques described herein may be adapted for use by a broad variety of software applications, online or web services, software features, or support services where data may be stored in a distributed system. Additionally, it should be noted that although, in certain examples described herein, particular computing devices or components are described as performing certain tasks (e.g., dividing a series of blocks into groups, distributing groups to processing entities, applying functions to groups, returning results of functions, merging results, employing results in processing data, and the like), such tasks may be performed by one or more additional local or remote computing devices or components (e.g., connected via a wired or wireless network).

FIG. 1 illustrates an example of a computing environment 100 used to manage blocks in a distributed system, according to embodiments of the present disclosure. As shown, the computing environment 100 includes device 120, distributed system 130, management device 140, and one or more devices 150 connected via network 110. The network 110, in general, may be a wide area network (WAN), local area network (LAN), wireless LAN (WLAN), personal area network (PAN), a cellular network, etc. In a particular embodiment, the network 110 is the Internet.

Device 120 is representative of a computing system, such as a desktop or laptop computer, tablet, or mobile phone, hosting one or more applications which maintain data on distributed system 130 (which may, for example, comprise a hash chain or blockchain). For example, device 120 includes an application 122. The application 122 may be representative of a component of a client server application (or other distributed application) which can communicate with distributed system 130 over network 110. Application 122 may be a conventional software application (e.g., a tax preparation application) installed on device 120, and may communicate with distributed system 130 over network 110 in order to store, manage, and retrieve data 134 stored in blocks 132a-n.

Distributed system 130 may comprise one or a plurality of devices (e.g., separate computing systems such as servers) sharing resources and capabilities in order to provide users with a single and integrated coherent network comprising blocks 132a-n. In some embodiments, distributed system 130 comprises a hash chain, such as a blockchain. Blocks 132a-n may, for example, comprise blocks in a blockchain. Data 134 may, for example, comprise data associated with application 122, and is stored on one or more of blocks 132a-n. Distributed system 130 may manage the addition and removal of blocks 132a-n from the chain using any number of techniques known in the art, such as a consensus protocol or trusted authority. In certain embodiments, for example "miners" may be employed, as is known in the art, to ensure the integrity of modifications to the chain. Distributed system 130 may return data 134 in response to requests (e.g., from application 122), and may also include cryptographic link information from one or more blocks 132 which were the source of requested data in the response for security and verification purposes. Distributed system 130 may also include root hashes, hash trees, and other relevant information in a response.

Management device 140 may comprise a computing system (e.g., a server) which performs functions related to management of distributed system 130. In certain embodiments, management device 140 is part of distributed system 130. As shown, management device 140 comprises a block manager 142, which may perform functions related to managing blocks 132a-n on distributed system 130 according to techniques described herein. For example, block manager 142 may build a secondary data structure over blocks 132a-n in order to divide the blocks into separate groups which can be processed in parallel (e.g., by management device 140 and/or one or more devices 150, which may, in certain embodiments, also be part of distributed system 130).

In one embodiment, block manager 142 creates a list of lists based on blocks 132a-n. Block manager 142 may, for example, distribute blocks 132a-n among C separate lists ("C" may represent the number of processing devices available, such as the number of devices 150), and maintain a master list which comprises all C lists. Creation of lists may, for example, be demonstrated by the following pseudocode, in which "tail" represents the last block in the chain:

```
block = tail
i=0
while block != nil {
list[i].add(block)
block = block->previous
i++
i = i mod C
}
```

In this example, given a hash chain represented by "aa<-bb<-cc<-dd" (e.g., where the letters represent blocks and "<-" represents a cryptographic link), and where C=2, the resulting list of block lists would be: "<<dd, bb>, <cc, aa>>". Having created this data structure, block manager 142 may proceed to distribute lists to processing entities (e.g., devices 150) to be processed in parallel (e.g., the devices 150 may apply one or more functions, such as map and/or reduce, to each of the lists separately). The distribution of lists for processing to a pool of processing entities may be demonstrated by the following pseudocode, in which C represents the processing entities:

```
for i, C in pool {
C.execute(list[i], function_list, reduce, callback)
// execute is a asynchronous and will respond on the callback.
// function_list contains an optional ordered list of filter and map
// functions to execute over the blocks, reduce is an optional reduce
// function to apply to the blocks after any map/filter functions have
// been applied.
}
```

In alternative embodiments, instead of using a list of lists, block manager 142 may create an array based on blocks 132*a-n* (e.g., assigning each block an index in the array), and then split the array into groups for processing by the processing entities based on index. Creation of an array may, for example, be demonstrated by the following pseudocode:

```
block = tail
i=0
while block != nil {
array[i] = block
block = block->previous
i++
}
```

Having created this array data structure, block manager 142 may then split the blocks into groups based on index. Assigning the blocks to groups for processing by processing entities (represented by C) may be demonstrated by the following pseudocode:

```
s = n/C
b=0
for i, C in pool {
C.execute(array.slice(b, b+s), function_list, reduce, callback)
// using slice, but could also pass in the boundaries along with entire
// array
b += s
}
```

In alternative embodiments, block manager 142 may create a skip list (e.g., a data structure with levels maintaining a linked hierarchy of subsequences) over blocks 132*a-n* so that the blocks can be divided into groups for processing based on levels of the skip list. A level of the skip list may be identified at which the number of blocks ("Y") is less than or equal to C. This may be determined, for example, based on a probabilistic heuristic or by modifying the base skip list structure to maintain a count for each level. Block manager 142 may choose the level ("L") which provides the maximum count that still satisfies Y≤C. At this point, the processing of blocks at level L may be represented by the following pseudocode:

```
block = skiplist->header->forward[L]
for C in pool {
C.execute(block, function_list, reduce, callback)
block = block->forward[L]
}
```

Other techniques may be employed in cases where L contains more blocks than processing entities C in the pool (e.g., some processing entities may be assigned to process a plurality of blocks at level L).

In alternative embodiments, block manager 142 may create a balanced binary tree over blocks 132*a-n*. The tree may be rebalanced as the number of blocks 132*a-n* in the chain grows. The blocks to be distributed to the pool may then be found at L=log 2(c). Block manager 142 may use a breadth first search to visit the blocks at L, which it may then provide to each processing entity C in the pool. Alternatively, a B-tree data structure may be used instead of a balanced binary tree.

After the processing entities (e.g., devices 150, processes running on devices 150, or the like) have completed processing the groups of blocks, they may return results to block manager 142. Block manager 142 may then merge the results from the one or more processing entities into combined results. In certain embodiments, as appropriate, block manager 142 may apply a final reduce function to the combined results. The combined results may then be used in further processing data. For example, the combined results may be returned to application 122 in response to a request for performing one or more functions on the data (e.g., techniques described herein may be initiated by such a request from application 122, may be initiated by block manager 142, or may be initiated by some other local or remote device or component).

If processing requires ordering of the blocks (e.g., if the order of blocks 132*a-n* on distributed system 130 must be maintained), then the source of returned values (e.g., the blocks from which each data item originated) may be maintained by block manager 142 along with block data, results, and/or combined results. Furthermore, techniques described herein do not necessitate a single level hierarchy, with a single entity (e.g. block manager 142) distributing blocks to one level of children (e.g., one or more devices 150). Alternatively, a parent entity (e.g., block manager 142) may distribute blocks to children (e.g., a subset of devices 150), which may in turn further subdivide the blocks and distribute them to sub-children (e.g., another subset of devices 150), and so forth.

Data manager 142 may store secondary data structure information locally (e.g., on management device 140), remotely (e.g., on devices 150 or distributed system 130), or both. Furthermore, in some embodiments, data manager 142 may store information related to secondary data structures (e.g., index values and the like) in blocks 142*a-n*. For example, in an embodiment, block manager 142 creates a secondary data structure as a blockchain is built. When a block 132 is appended to the chain, block manager 142 may update the secondary data structure based on the block 132, and may store information about the secondary data structure (such as an index value) in the block 132 as it is appended. Additionally, it is noted that the term "block" may be understood generally to refer to any item or portion of data, regardless of the particular structure in which it is stored. Processing entity may be understood generally to refer to any entity capable of processing data (e.g., a physical or virtual device, process, thread, and the like).

Embodiments of the present disclosure improve the functioning of computing environments and applications by reducing the time and resources required to perform functions on data stored in distributed systems as required during execution of applications and other components (e.g., through intelligent grouping of blocks and distribution of groups for processing in parallel). Techniques described herein may therefore allow for distributed systems to more effectively store and manage data associated with one or more applications and/or components.

Figure 2:
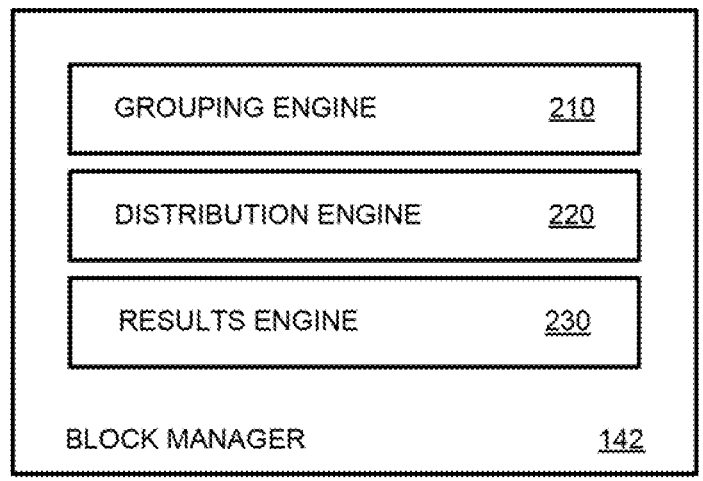
FIG. 2 illustrates components of a block manager, according to one embodiment.

FIG. 2 illustrates components of block manager 142 described relative to FIG. 1, according to one embodiment. As shown, block manager 142 comprises a grouping engine 210, a distribution engine 220, and a results engine 230.

Each of these components may perform functions of block manager 142 associated with techniques described above. In other embodiments, the functions of block manager 142 may alternatively by performed by any number of local or remote components.

For example, grouping engine 210 may employ techniques described herein to build one or more secondary data structures over a series of blocks (e.g., blocks 132a-n) and use the one or more secondary data structures to separate the series of blocks into one or more groups to be processed. For example, grouping engine 210 may generate a list of lists, where each list comprises a subset of blocks 132a-n, and where all of the lists of blocks are maintained in a master list. Alternatively, grouping engine may employ different types of secondary data structures, such as arrays, skip lists, balanced binary trees, B-trees, and the like, in order to separate the series of blocks into groups.

Distribution engine 220 may perform operations described herein related to distributing groups of blocks to processing entities for processing (e.g., in parallel). For example, distribution engine 220 may assign each list of a list of lists to one or more processing entities (e.g., devices 150) so that the processing entities may apply one or more functions (e.g., map, reduce, and the like) to the lists. Distribution engine 220 may ensure that groups are efficiently distributed to available and appropriate processing entities for the one or more functions to be performed.

Results engine 230 may employ techniques described herein to receive the results of processing from the one or more processing entities (e.g., devices 150) and merge the results into combined results. For example, if the processing entities perform a map/filter function on the groups and return filtered results, results engine 230 may combine the filtered results from each processing entity into a single set of filtered results representing the results of applying the filter to the entire series of blocks. In certain embodiments, results engine 230 may apply one or more functions to the combined results as appropriate. For example, results engine 230 may apply a reduce function to combined results in order to reduce the results as appropriate.

Figure 3:
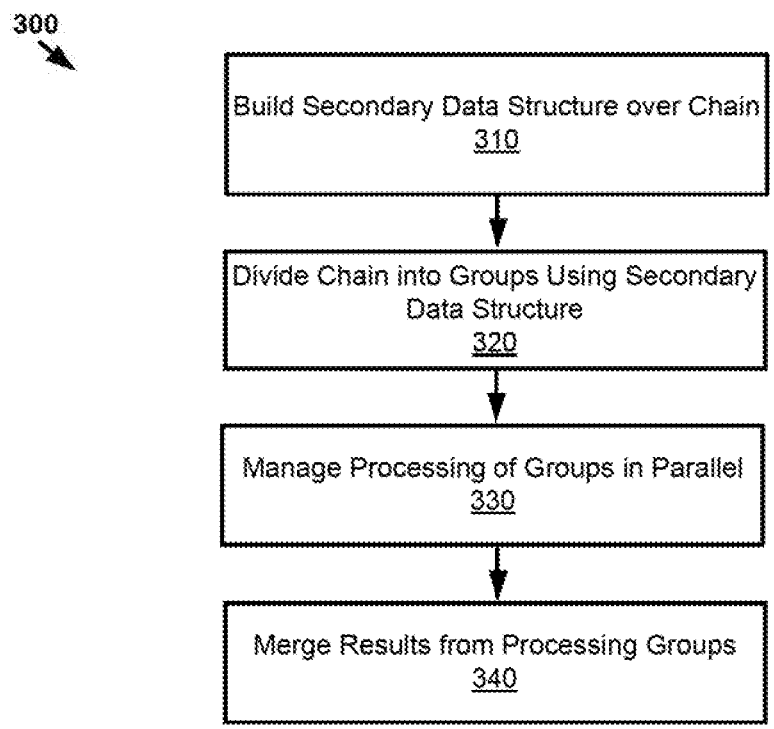
FIG. 3 illustrates example operations for managing blocks in a distributed system, according to one embodiment.

FIG. 3 illustrates example operations 300 for managing blocks in a distributed system, according to one embodiment. Operations 300 may be performed, for example, by one or more components of block manager 142.

At 310, block manager 142 builds a secondary data structure over a chain, such as a series of blocks 132a-n on distributed system 130. The secondary data structure may, for instance, comprise a list of lists, an array, a skip list, a balanced binary tree, a B-tree, or the like.

At 320, block manager 142 divides the chain (e.g., blocks 132a-n) into groups using the secondary data structure created at 310. For example, block manager 142 may divide a list of block lists into groups based on the block lists, or may divide an array of blocks into groups based on index.

At 330, block manager 142 manages the processing of the groups in parallel. For example, block manager 142 may distribute the groups to one or more processing entities (e.g., devices 150), which may apply one or more functions (e.g., map, reduce, and the like) to the groups in parallel. In certain embodiments, block manager 142 may distribute groups to processing entities based on the availability and suitability (e.g., performance capabilities) of the processing entities. In certain embodiments, block manager 142 instructs the processing entities to perform the one or more functions on the groups.

At 340, block manager 142 merges the results from the processing entities into combined results. For example, the processing entities may return results of performing one or more functions on the groups, and block manager 142 may combine the results. In certain embodiments, block manager 142 may also apply one or more functions to the combined results, such as a reduce function.

Figure 4:
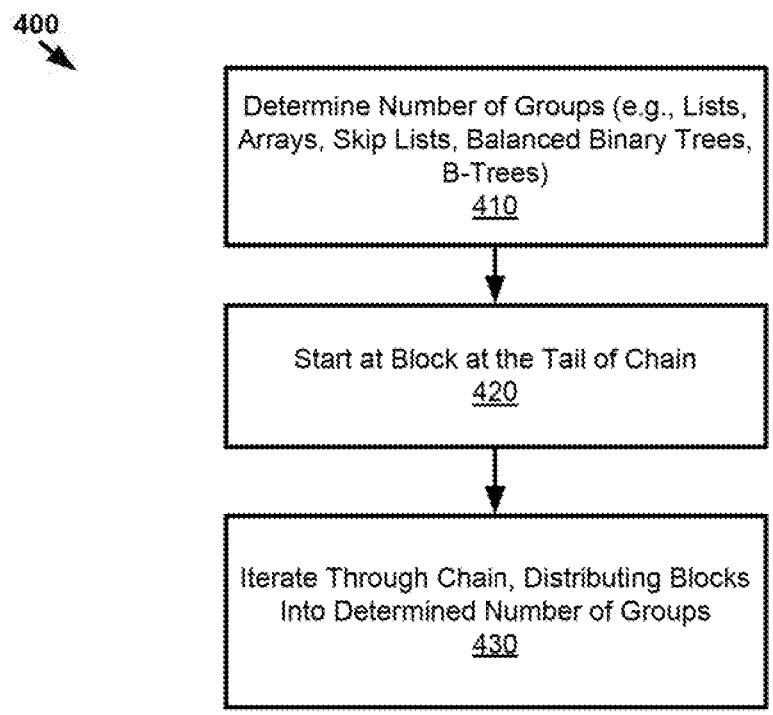
FIG. 4 illustrates additional example operations for managing blocks in a distributed system, according to one embodiment.

FIG. 4 illustrates additional example operations 400 for managing blocks in a distributed system, according to one embodiment. Operations 400 may be performed, for instance, by block manager 142 as part of one or more of operations 300 above (e.g., operations 310, 320, and 330).

At 410, block manager 142 determines a number of groups into which blocks 132a-n will be divided. For example, in certain embodiments, the number of groups is determined based on the number of processing entities (e.g., devices 150) available. The number of groups may, for example, equal the number of processing entities.

At 420, block manager 142 begins the process of dividing blocks 132a-n into groups by identifying the block which comprises tail of the chain. This may, for example, comprise block 132n in distributed system 130.

At 430, block manager 142 iterates backwards through the chain starting at the tail, distributing blocks 132a-n into the determined number of groups. Block manager 142 may accomplish this by, for example, building a secondary data structure (e.g., a list of lists, array, skip list, balanced binary tree, B-tree, or the like) based on blocks 132a-n and the number of groups, and then distributing the blocks in groups to processing entities based on aspects of the secondary data structure (e.g., the lists from a list of lists, indexes of an array, levels of a skip list, the hierarchical structure of a tree, etc).

As described with respect to operations 400, certain aspects of the present disclosure may be performed simultaneously. For example, blocks may be divided into groups by the way the secondary data structure is constructed, or in the act of distributing them to processing entities. In alternative embodiments, the number of groups is not determined in advance, and blocks are simply distributed to processing entities until all blocks have been distributed.

Figure 5:
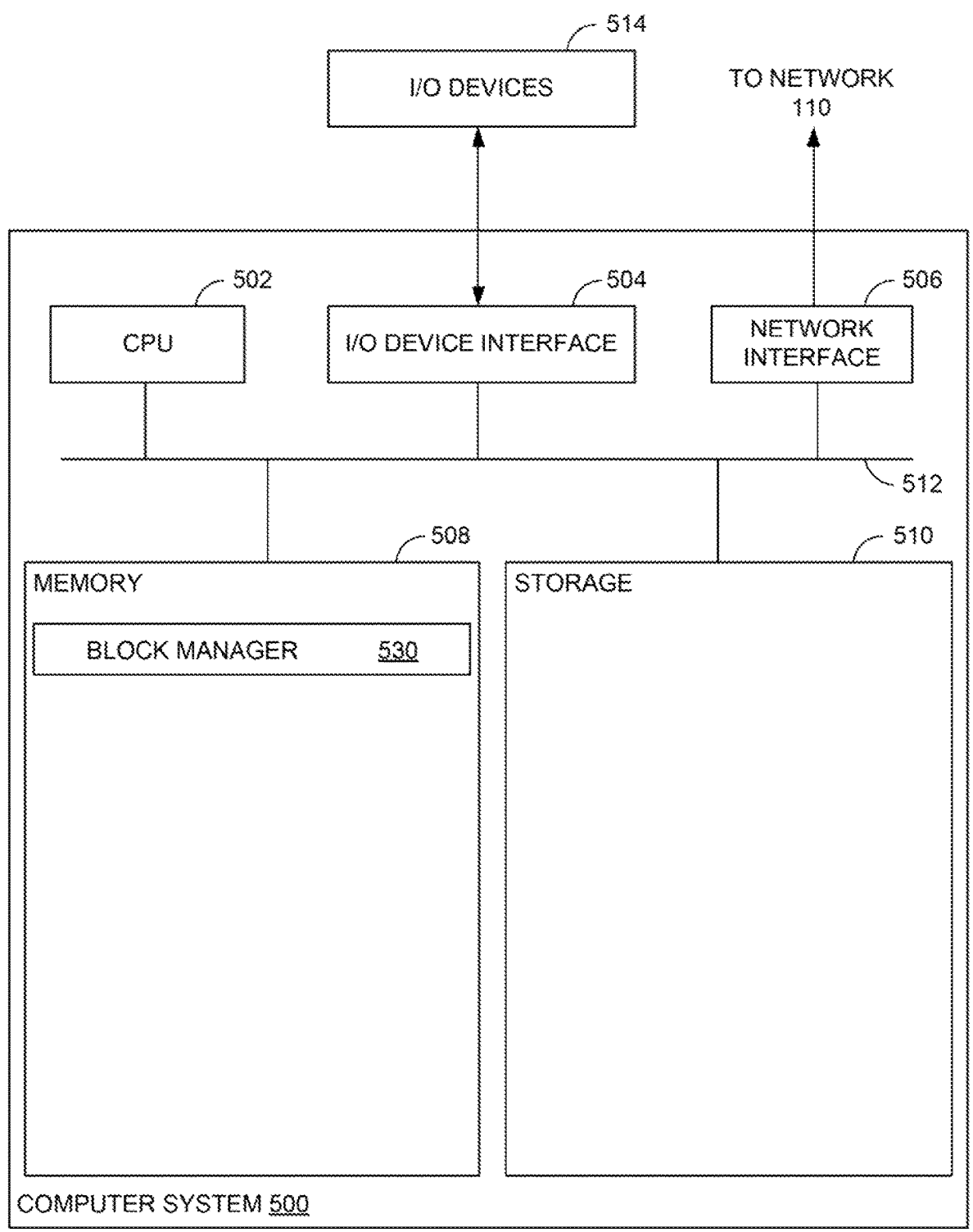
FIG. 5 illustrates an example computing system used for managing blocks in a distributed system, according to one embodiment.

FIG. 5 illustrates an example development system in which data management using witness blocks may be performed, according to embodiments of the present disclosure. As shown, the system 500 includes, without limitation, a central processing unit (CPU) 502, one or more I/O device interfaces 504 which may allow for the connection of various I/O devices 514 (e.g., keyboards, displays, mouse devices, pen input, etc.) to the system 500, network interface 506, a memory 508, storage 510, and an interconnect 512.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, memory 508, and storage 510. CPU 502 is included to be representative of a single CPU, multiple CPUs, a single CPU having multiple processing cores, and the like. Additionally, the memory 508 is included to be representative of a random access memory. Furthermore, the storage 510 may be a disk drive, solid state drive, or a collection of storage devices distributed across multiple storage systems. Although shown as a single unit, the storage 510 may be a combination of fixed and/or removable storage devices, such as fixed disc drives, removable memory cards or optical storage, network attached storage (NAS), or a storage area-network (SAN).

As shown, memory 508 includes a block manager 530, which may comprise a component (e.g., local or distributed)

which manages data remotely maintained on a distributed system, such as a hash chain (e.g., functionality described above with respect to FIGS. 1-4). Block manager 530 may use secondary data structures to divide a series of blocks into groups to be processed in parallel in order to improve efficiency as described herein. The block manager 530 in memory 508 may communicate with other devices (e.g., device 120, devices 150, and other devices which make up distributed system 130) over network 110 through network interface 506 (e.g., in order to access, modify, store, group, send, and otherwise process data associated with blocks 132a-n as described herein).

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for managing a series of blocks in a distributed system, comprising:
dividing the series of blocks into a first plurality of groups, wherein a number of the first plurality of groups is equal to a number of available processors;
distributing the first plurality of groups to the number of available processors, wherein each available processor of the number of available processors processes only a respective group of the first plurality of groups by applying one or more functions to the respective group of the first plurality of groups in parallel;
receiving, from the available processors, results of the one or more functions; and
merging the results to generate combined results of processing the first plurality of groups in parallel, wherein the combined results are used in processing data;
appending a new block to fee series of blocks;
updating fee first plurality of groups to create a second plurality of groups based on appending the new block; and
distributing the second plurality of groups to the available processors.

2. The computer-implemented method of claim 1, wherein the first plurality of groups comprises a plurality of lists, and wherein the plurality of lists is maintained in a master list.

3. The computer-implemented method of claim 1, wherein dividing the series of blocks into the first plurality of groups comprises:
creating an array based on the series of blocks, wherein each block is assigned an index in the array; and
splitting the array into the first plurality of groups based on the indexes of the blocks.

4. The computer-implemented method of claim 1, wherein the first plurality of groups comprises a plurality of levels of a skip list.

5. The computer-implemented method of claim 1, wherein dividing the series of blocks into the first plurality of groups comprises:
creating a tree based on the series of blocks; and
using a breadth-first search of the tree to split the series of blocks into the first plurality of groups.

6. The computer-implemented method of claim 5, wherein the tree comprises either a balanced binary tree or a B-tree.

7. The computer-implemented method of claim 1, wherein the one or more functions comprise one or more of:
a map function; or
a reduce function.

8. The computer-implemented method of claim 1, further comprising: applying a reduce function to the combined results.

9. A computing device for managing a series of blocks in a distributed system, the computing device comprising:
a memory; and
a processor configured to perform a method for managing a series of blocks in a distributed system, the method comprising:
dividing the series of blocks into a first plurality of groups, wherein a number of the first plurality of groups is equal to a number of available processors;
distributing the first plurality of groups to the number of available processors, wherein each available processor of the number of available processors processes only a respective group of the first plurality of groups by applying one or more functions to the respective group of the first plurality of groups in parallel;

receiving, from the available processors, results of the one or more functions; and merging the results to generate combined results of processing the first plurality of groups in parallel, wherein the combined results are used in processing data;

appending a new block to the series of blocks;

updating the first plurality of groups to create a second plurality of groups based on appending the new block; and distributing the second plurality of groups to the available processors.

10. The computing device of claim 9, wherein the first plurality of groups comprises a plurality of lists, and wherein the plurality of lists is maintained in a master list.

11. The computing device of claim 9, wherein dividing the series of blocks into the first plurality of groups comprises:

creating an array based on the series of blocks, wherein each block is assigned an index in the array; and splitting the array into the first plurality of groups based on the indexes of the blocks.

12. The computing device of claim 9, wherein the first plurality of groups comprises a plurality of levels of a skip list.

13. The computing device of claim 9, wherein dividing the series of blocks into the first plurality of groups comprises:

creating a tree based on the series of blocks; and using a breadth-first search of the tree to split the series of blocks into the first plurality of groups.

14. The computing device of claim 13, wherein the tree comprises either a balanced binary tree or a B-tree.

15. The computing device of claim 9, wherein the one or more functions comprise one or more of:

a map function; or a reduce function.

16. The computing device of claim 9, wherein the method further comprises: applying a reduce function to the combined results.

17. A non-transitory computer-readable medium comprising instructions that, when executed by a processor of a computing device, cause the computing device to perform a method for managing a series of blocks in a distributed system, the method comprising:

dividing the series of blocks into a first plurality of groups, wherein a number of the first plurality of groups is equal to a number of available processors;

distributing the first plurality of groups to the number of available processors, wherein each available processor of the number of available processors processes only a respective group of the first plurality of groups by applying one or more functions to the respective group of the first plurality of groups in parallel;

receiving, from the available processors, results of the one or more functions; and merging the results to generate combined results of processing the first plurality of groups in parallel, wherein the combined results are used in processing data;

appending a new block to the series of blocks;

updating the first plurality of groups to create a second plurality of groups based on appending the new block; and distributing the second plurality of groups to the available processors.

18. The non-transitory computer-readable medium of claim 17, wherein the first plurality of groups comprises a plurality of lists, and wherein the plurality of lists is maintained in a master list.

19. The non-transitory computer-readable medium of claim 17, wherein dividing the series of blocks into the first plurality of groups comprises:

creating an array based on the series of blocks, wherein each block is assigned an index in the array; and splitting the array into the first plurality of groups based on the indexes of the blocks.

20. The non-transitory computer-readable medium of claim 17, wherein the first plurality of groups comprises a plurality of levels of a skip list.

21. The non-transitory computer-readable medium of claim 17, wherein dividing the series of blocks into the first plurality of groups comprises:

creating a tree based on the series of blocks; and using a breadth-first search of the tree to split the series of blocks into the first plurality of groups.

22. The non-transitory computer-readable medium of claim 21, wherein the tree comprises either a balanced binary tree or a B-tree.

23. The non-transitory computer-readable medium of claim 17, wherein the one or more functions comprise one or more of: a map function; or a reduce function.

24. The non-transitory computer-readable medium of claim 17, wherein the method further comprises: applying a reduce function to the combined results.

* * * * *